UNITED STATES PATENT OFFICE.

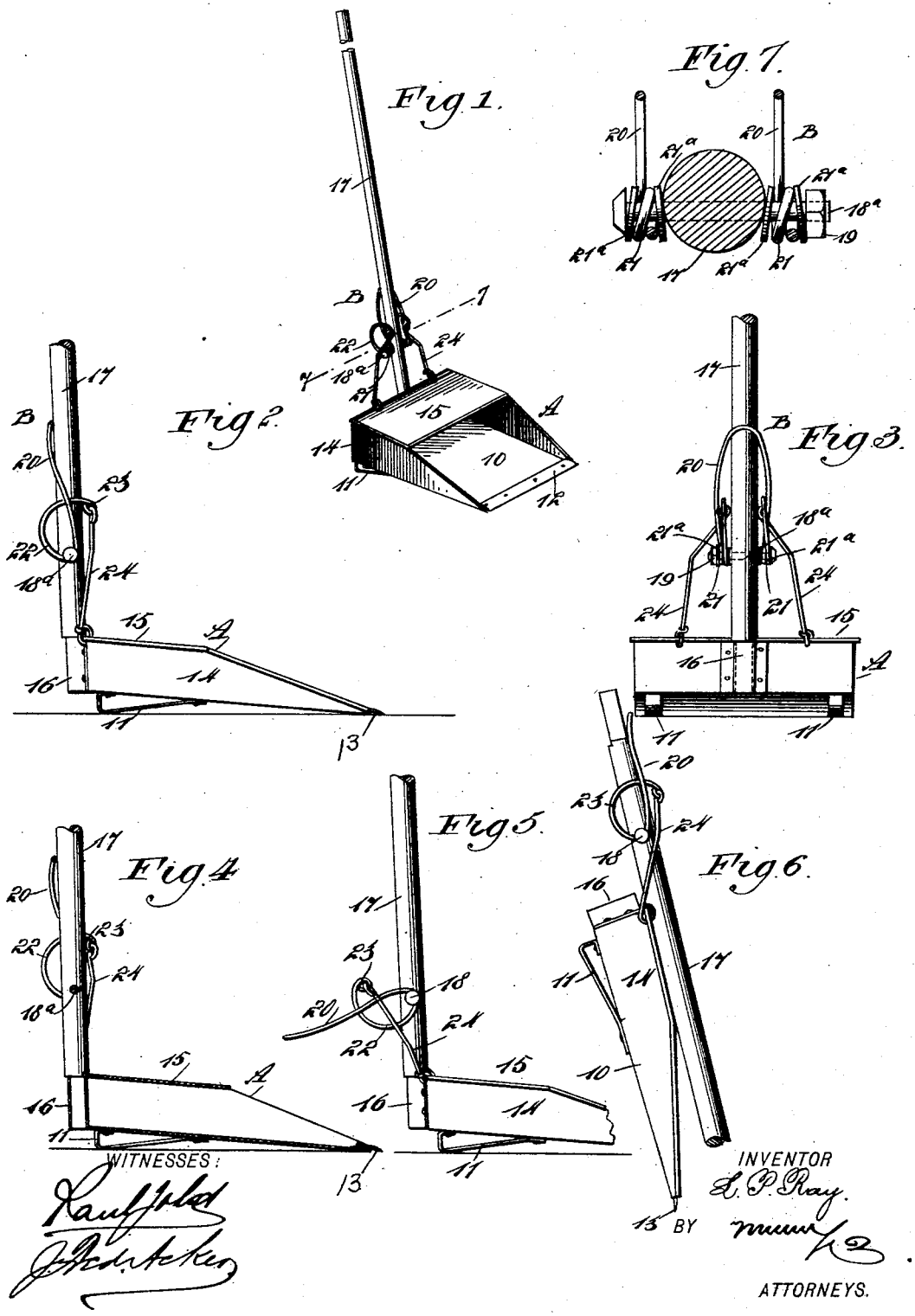

LLOYD P. RAY, OF SEATTLE, WASHINGTON.

DUST-PAN.

SPECIFICATION forming part of Letters Patent No. 587,607, dated August 3, 1897.

Application filed March 25, 1897. Serial No. 629,206. (No model.)

*To all whom it may concern:*

Be it known that I, LLOYD P. RAY, of Seattle, in the county of King and State of Washington, have invented a new and useful Improvement in Dust-Pans, of which the following is a full, clear, and exact description.

The object of my invention is to provide a dust-pan which will be so constructed as to lie close to the floor or surface from which the dust is to be taken up and wherein the receiving edge of the pan will be of a stronger material than the body portion.

Another object of the invention is to provide the pan with a removable and adjustable handle and a spring fastening device which will hold the handle at an angle to the pan when the pan is in use and which will permit the handle to be carried to a parallel position with the pan, and will serve, furthermore, as a means for suspending the pan and handle from a convenient support.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved dust-pan in position for use. Fig. 2 is a side elevation of the pan with the handle in position for use. Fig. 3 is a rear elevation of the pan, the handle being in its upright position. Fig. 4 is a longitudinal section through the pan and its socket, also a vertical section through the fastening device for the handle. Fig. 5 is a partial side elevation of the dust-pan, illustrating the fastening device for the handle as in position to permit the removal of the handle from the body of the pan. Fig. 6 is a side elevation of the pan and its handle, the two parts being in position to be hung up, and Fig. 7 is a horizontal section taken substantially on the line 7 7 of Fig. 1.

The dust-pan A approximates the shape of an ordinary pan, inasmuch as it comprises a bottom 10, sides 14, inclined near the mouth of the pan, and a hood 15, which extends over the upper portion of the sides of the pan at the rear, the rear of said pan being closed. The pan, however, is provided at its rear upon its under face with feet 11, which give a forward tip or inclination to the bottom of said pan, and at the forward or receiving end of said pan-bottom a plate 12 is secured, made of steel or like material or a material which is harder than that from which the body of the pan is constructed. The plate 12 is made to taper from its back in direction of its forward edge, which is quite thin and bent downward to form a curved surface 13, capable of being brought in close engagement with the surface from which the sweepings are to be removed.

At the back central portion of the pan a socket 16 is formed, in which the lower end of a handle 17 is removably placed. The socket 16 is rectangular in cross-section, as is likewise the end of the handle 17, which enters the socket. At each side of the handle 17, near its lower end, or the end which is adapted to enter the socket 16, a pin 18 is secured, as shown in Fig. 5, or, as illustrated in Fig. 3, a bolt $18^a$ may be passed through the handle from side to side beyond the side faces of the handle, being provided at one end with a nut 19.

Two washers $21^a$ are secured upon each pin 18 or each projecting end of the bolt $18^a$. The handle is held securely in an upright position by means of a spring fastening device B. This spring fastening device is made, preferably, from spring-wire. In the body portion of this fastening device the wire is bent upon itself to form a loop 20, adapted to engage the rear face of the handle above the pins 18 or the bolt $18^a$. The wire forming the loop 20 is carried forward, or to a position in advance of the pins 18 or the bolt $18^a$, and is again bent upon itself to form a coil 21, which is carried around the pins 18 or around the extensions of the bolt $18^a$ between the washers $21^a$, while the lower ends of the wire forming the loop 20 are carried upward over the pins or the bolt within the loop and beyond the forward face thereof, terminating in eyes 23. The eyes 23 receive eyes formed upon links 24, which links are carried laterally from the loop 20, or in direction of the sides of the body of the pan, and are again carried downward to a pivotal engagement with the upper rear edge portion of the pan at each side of its socket 16, as shown in Figs. 1 and 3.

In operation when the handle has been placed in the socket 16, the loop being in the lateral position shown in Fig. 5, and the loop is carried upward to an engagement with the back of the handle, as shown in Figs. 1, 2, and 3, the coils 21 in the loop will be contracted or brought under tension by reason of the washers engaging with the side portions of the loops, the washers at that time standing at angles to one another, diverging at the front and converging at the rear, whereby the loop will be forced to an engagement with the back of the handle and held in such position, bracing the said handle and enabling the pan to be effectually used.

When the pan is not in use, the loop of the fastening device is carried downward and the handle is removed from its socket and placed over the top of the body of the pan in the position shown in Fig. 6, whereupon the loop portion of the fastening device may be used as a means for hanging the handle and the pan from any convenient support.

Having thus described my invention, I claim as new and desire to secure by Letters Patent—

1. The combination with a dust-pan, of the handle connected therewith, and provided with lateral extensions, a spring-arm connected with said extensions, links connecting said spring-arm with the pan, and means by which said spring-arm is brought under tension to fasten the handle to the pan, as set forth.

2. The combination, with a dust-pan or a like receptacle and a handle connected therewith, of a fastening device for the handle, consisting of a spring-arm having coils intermediate of its ends, extensions from the handle passed through the said coils, the extremities of the arm being carried rearward and upward, and a link connection between the extremities of the arm and the pan, as and for the purpose set forth.

3. The combination, with a dust-pan or a vessel of like character, a handle connected with the pan at its lower end, projections from the sides of the handle, and washers mounted on said projections, of a fastening device consisting of a loop straddling the handle, provided with coils carried around the extensions of the handles between the washers, the terminals of the loops being carried rearward and upward, and links connecting the extremities of the loop and the pan at each side of the handle, as and for the purpose specified.

4. The combination, with a pan having a socket formed at its rear, a handle removably fitted in the said socket, extensions from the handle at opposite sides, and washers loosely mounted on the extensions, of a fastening device for the handle, consisting of a loop of spring-wire straddling the handle, coiled around the extensions from the handle between the washers, the members of the loop being carried rearward and upward within the body of the loop, and links connecting the terminals of the members of the loop with the pan at each side of the handle, as and for the purpose set forth.

5. The combination with the dust-pan, and the handle connected therewith, of the spring-arm attached to said handle, links connecting the pan with one end of said arm, and an extension from the other end of said arm arranged to snap against said handle, whereby the spring-arm is brought into tension with said links and the handle is fastened to the pan, substantially as set forth.

6. The combination with the dust-pan having a body, a tip of material harder than that of which said body is constructed and a socket formed at its rear, of a handle removably fitted in said socket and provided with lateral pins, an arm formed of spring-wire bent to form a loop, coils between said loop and its ends and received upon said pins, and eyes in its ends, and links attached to said pan and formed with eyes in engagement with the eyes of said spring-arm, the said loop being arranged to snap against said handle above said pins and bring said arm into tension with said links to fasten the handle in the socket, as and for the purpose set forth.

LLOYD P. RAY.

Witnesses:
AUGUST W. SCHROEDER,
WILLIAM M. HINES.